United States Patent

Doehler

[15] 3,640,572
[45] Feb. 8, 1972

[54] VEHICLE SAFETY GUARD

[72] Inventor: Emil J. Doehler, 58 Dundee Street, Buffalo, N.Y. 10306

[22] Filed: Dec. 16, 1969

[21] Appl. No.: 885,424

[52] U.S. Cl. .................................. 297/390, 280/150 AB
[51] Int. Cl. ............................................. A62b 35/00
[58] Field of Search ................. 297/403, 384, 407, 269; 280/150 B; 248/292, 293, 291; 16/145, 146, 142

[56] References Cited

UNITED STATES PATENTS

| 672,602 | 4/1901 | Grenier | 297/367 X |
| 2,661,221 | 12/1953 | Lockwood et al. | 297/390 X |
| 3,118,700 | 1/1964 | Wimmersperg | 280/150 SB |
| 3,262,716 | 7/1966 | Graham | 297/390 |
| 3,309,139 | 3/1967 | Turner et al. | 297/367 |

FOREIGN PATENTS OR APPLICATIONS

| 1,318,721 | 1/1962 | France | 297/390 |
| 1,008,155 | 2/1952 | France | 297/390 |

*Primary Examiner*—James T. McCall
*Attorney*—Sommer, Weber & Gastel

[57] ABSTRACT

This disclosure is of a restraining device or support for holding a person in a seat in a vehicle in case of accident, causing sudden stop of forward motion of the vehicle. The support is so mounted that it is easily positioned in supporting relation to the front of the person when seated and also easily swung upwardly into an inoperative position and does not require attachment to the person.

5 Claims, 5 Drawing Figures

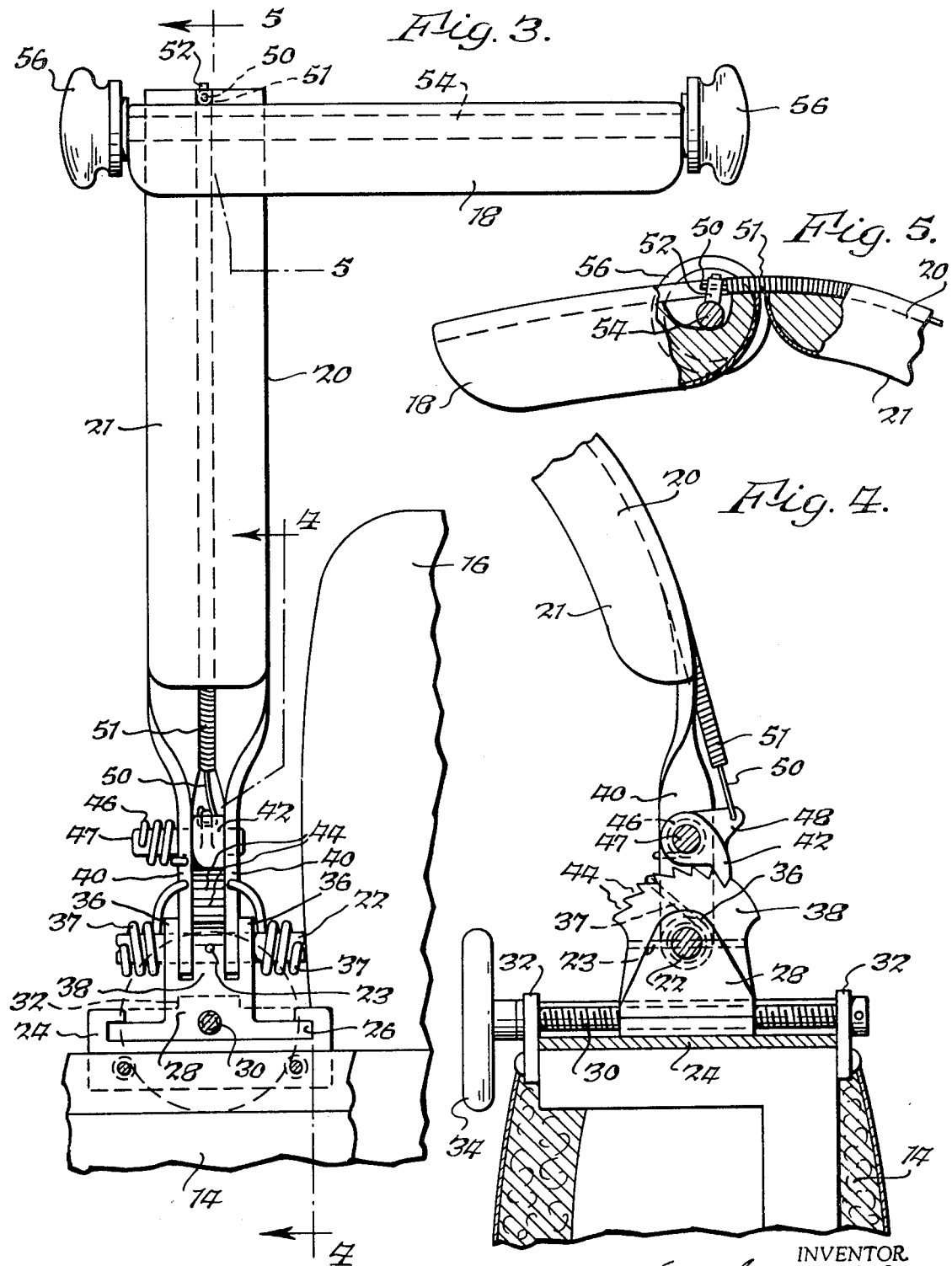

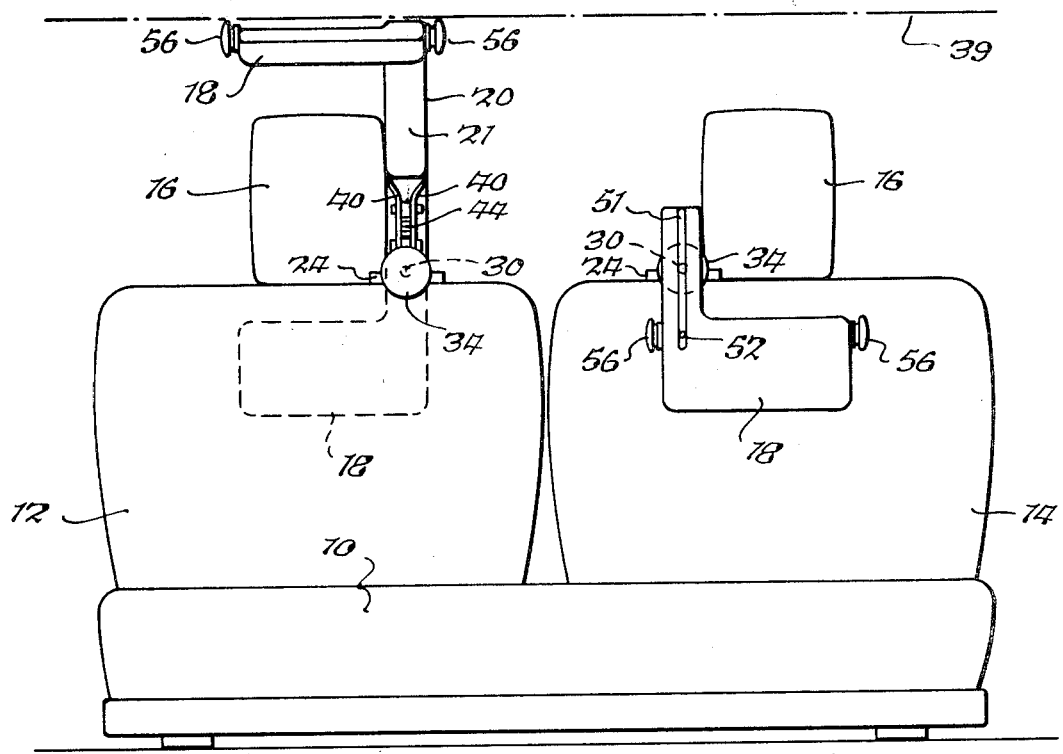
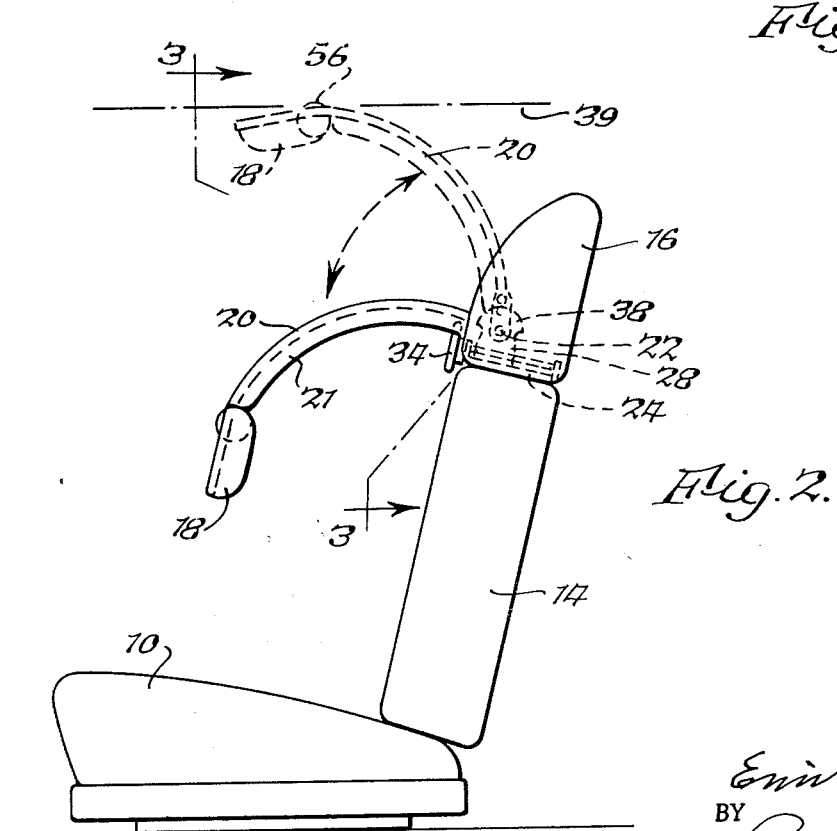

VEHICLE SAFETY GUARD

It is an object of this invention to provide a safety device including a pad or cushion mounted on the seat back to swing downwardly in front of a person against a spring force which holds the device in an inactive position when not needed.

A further object is to provide a safety pad which is put into use by pulling it down in front of a person.

It is also an object to provide a mounting for a safety pad which is held in its operative position by a ratchet which when released permits the pad to move upwardly into its inoperative position.

A further object is to provide a mechanism by which the safety pad is held in front of the person to be protected without being attached to the person.

Still another object is to mount such safety pad so that when in operative position in front of a person sitting on the vehicle seat the person is free to move laterally toward the door of the vehicle and from behind the safety pad in order to escape in the event of a bad crash or malfunction of the safety mechanism so that it cannot be raised in an inoperative position.

In the accompanying drawings:

FIG. 1 is a front elevation of two front seats of a vehicle and showing the protecting device in its operative position on one seat and in an inoperative position for the other seat.

FIG. 2 is a side elevation of one of the front seats and showing the protecting device as shown in FIG. 1.

FIG. 3 is a sectional view thereof on line 3—3, FIG. 2 on an enlarged scale.

FIG. 4 is a fragmentary, sectional elevation thereof on line 4—4, FIG. 3.

FIG. 5 is a sectional elevation thereof on line 5—5, FIG. 3.

My improved device may be used in connection with a seat in any type of vehicle in which the seat is arranged transversely thereof and is shown in the accompanying drawings as applied to an automobile having a seat 10 resting upon a floor 11 of the vehicle, and 12 and 14 are the backs for the seat. The back 14, for example, is for the driver's seat, and the backs of both seats are provided with headrests 16 secured to the upper portions of the backs 12 and 14.

Cushion or pads 18 may be of any desired shape and construction and are normally selectively movable to the front of the persons to be protected, one of these pads being provided for each of the seats.

The cushions or pads 18 are rigidly secured to and cantilever-mounted at their inboard ends on holding or support arms which are of curved shape and are made of two parallel strips 20 and 21. For example, these arms may be made of spring steel and the upper or rear ends thereof are mounted on the backs 12 and 14. Each arm is arranged adjacent the inboard end of its seat back 12 or 14 and has a pivotal connection with the same, preferably at the upper end thereof or in headrest 16. Since the mounting of the arms is the same for both seats in the vehicle, this description will be applied only to the seat ordinarily occupied by the driver but applies also to the other seat. The two-piece holding arm is swingable about a pivot 22 which is mounted in a support including a base member 24 secured on the seat back 14. The base member is provided with means for adjusting the holding arm to provide for persons of different body thicknesses and has a guide slot 26 in which an arm support 28 is slidable fore and aft of the line of travel of the vehicle.

The arm support 28 is rendered so adjustable of the vehicle by any suitable means, such as adjustable screw 30 having a threaded engagement with the support 28 and rotatable on fixed arms 32 mounted on the base member 24. The adjusting screw 30 is provided with means for turning the same, such as an adjusting wheel 34.

The arm support 28 has two upwardly extending brackets 36 on which the pivot member 22 is mounted against rotation by pin 23. The holding arm is preferably resilient to a slight extent and for this purpose the two pieces thereof may be of flat strips of spring steel each having a side thereof bent over at the upper end of the supporting arm. These two bent over parts form a substantially U-shaped portion 40 which fits between the brackets 36 of the arm support 28, and consequently the support arm may be swung up or down about the pivot 22 and is normally held in its upper position in contact with or adjacent to the ceiling 30 by springs 37. One end of each of the springs 37 is secured to the pivot member 22 and the other end of each springs bears against the downwardly extending U-shaped portion 40 of the support arm. Consequently the arm is normally held in an upper, inoperative position close to the ceiling 39 by means of the springs 37 and may be readily moved to its operative position in front of the chest of the person to be protected, and it may be held in its lower or operative position when the pad 18 is in front of the person to be protected. For this purpose a pawl and ratchet mechanism is provided including a pawl 42 pivotally mounted on the two piece support arm and ratchet teeth 44 in the upper edges of one of the brackets 38. The pawl is urged by a spring 46 into engagement with the ratchet teeth 44 so that the arm may be held in different lower positions, as shown in FIGS. 1 and 2.

Means are also provided for releasing the ratchet mechanism so that the spring 36 raises the arm to move the pad or cushion 18 upwardly into close proximity to the ceiling, and for this purpose there is provided on the pawl 42 an arm 48 integral therewith and to which is attached a cord 50 which extends along the back of the support arm and is suitably guided on the arm within a coil 51, for example, in a groove or slot formed between the two parts 20 and 21 of the support arm. The front or other end of the cord is secured to a projection 52 on a rotary bar or rod 54 which is mounted on the pad 18, as shown in FIG. 5. The opposite ends of this rod 54 may be provided with knobs or projections 56 which are in easy reach of the person receiving the protection. Consequently by turning the knobs 56 to a slight extent, tension is supplied to the cord 50 with the result of swinging the pawl from the ratchet so that the arm 20 is free to swing upwardly, due to the action of the springs 16. The support arm preferably also is covered with padding.

The protection device has the advantage that it is all mounted on the vehicle and has no part which must be buckled or fastened around or to the person to be protected. Such person after entering the vehicle merely pulls down the protecting pad or cushion 18 and adjusts it so that it will be a short distance from the person's chest. Consequently a person is held approximately in his seated position by means of the pad 18 which holds him against excessive forward movement, and the support arm holds him against sidewise movement only in an inboard direction but leaves him free for sidewise movement in an outboard direction toward the lateral side of the vehicle since there is no connection between the outboard end of the pad and the seat back. Normally when the person wishes to get out of the vehicle he can merely turn the rod 54 by means of either of the two knobs 56, thus causing the arm to swing upwardly out of the way, so that he can easily move out of the vehicle without untying or unbuckling himself from any harness. However, should the pawl and ratchet mechanism malfunction or in the event of a bad crash where the arm cannot be raised, the passenger can slide or be moved laterally from behind the cushioning pad toward the door of the vehicle.

It will be understood that various changes in the details, materials and arrangements of parts which have been herein described and illustrated in order to explain the nature of the invention may be made by those skilled in the art within the principle and scope of the invention as expressed in the appended claims.

I claim:

1. A safety device for a vehicle for limiting a passenger from being thrown forwardly out of a seat, including:

an arm of relatively rigid material having one end thereof pivoted on the back of a seat and arranged adjacent the inboard end thereof remote from the lateral side of the vehicle and normally selectively movable between an upper inoperative position and a lower operative position, and a cushioning pad rigidly secured to and cantilever-mounted at its inboard end on the other end of said arm and arranged to extend in front of the passenger occupying such seat when said arm is in its said operative position, whereby the device does not restrain a passenger occupying such seat from moving laterally toward said side of said vehicle.

2. A safety device according to claim 1 and means for adjusting said pad toward and away from said back to vary the spacing of said pad relative to said back and thereby accommodate persons in said seat of different body thicknesses.

3. A safety device according to claim 2 and including a screw rotatable on said back,
said arm having a threaded engagement with said screw to adjust said arm relatively to said back.

4. A safety device for a vehicle for limiting a passenger from being thrown forwardly out of a seat, including:

an arm of relatively rigid material having one end thereof pivoted on the back of a seat,
a cushioning pad rigidly secured to the other end of said arm to extend in front of the person to be protected when said arm is swung downwardly into protective position,
a screw thread and a nut mounted on and movable toward and away from said back to vary the spacing of said arm relatively to said back,
said nut having ratchet teeth thereon,
a pawl engaging with said ratchet teeth and mounted on said arm, and
a cord extending lengthwise of said arm and engaging said pawl to disengage the same from said ratchet teeth.

5. A safety device according to claim 4 in which said cord is manipulatable at said pad to move said pawl out of engagement with the said ratchet teeth.

* * * * *